(12) United States Patent
Refaat et al.

(10) Patent No.: US 12,204,333 B2
(45) Date of Patent: *Jan. 21, 2025

(54) VERIFYING PREDICTED TRAJECTORIES USING A GRID-BASED APPROACH

(71) Applicant: Waymo LLC, Mountain View, CA (US)

(72) Inventors: Khaled Refaat, Mountain View, CA (US); Kai Ding, Santa Clara, CA (US)

(73) Assignee: Waymo LLC, Mountain View, CA (US)

( * ) Notice: Subject to any disclaimer, the term of this patent is extended or adjusted under 35 U.S.C. 154(b) by 726 days.

This patent is subject to a terminal disclaimer.

(21) Appl. No.: 17/191,491

(22) Filed: Mar. 3, 2021

(65) Prior Publication Data
US 2021/0341927 A1    Nov. 4, 2021

Related U.S. Application Data

(63) Continuation of application No. 16/185,787, filed on Nov. 9, 2018, now Pat. No. 10,969,789.

(51) Int. Cl.
*G05D 1/02* (2020.01)
*G05D 1/00* (2024.01)

(52) U.S. Cl.
CPC ......... *G05D 1/0214* (2013.01); *G05D 1/0088* (2013.01); *G05D 1/0221* (2013.01); *G05D 1/0223* (2013.01)

(58) Field of Classification Search
CPC ......... B60W 50/0097; B60W 30/0953; B60W 30/0956; B60W 60/0027;
(Continued)

(56) References Cited

U.S. PATENT DOCUMENTS 6,393,370 B1    5/2002    Soika
9,104,965 B2    8/2015    Fritsch et al.
(Continued)

FOREIGN PATENT DOCUMENTS

CN    104812645 A    7/2015
CN    107168305 A    9/2017
(Continued)

OTHER PUBLICATIONS

Hoermann, Stefan, Martin Bach, and Klaus Dietmayer. "Dynamic occupancy grid prediction for urban autonomous driving: A deep learning approach with fully automatic labeling." 2018 IEEE International Conference on Robotics and Automation (ICRA). IEEE, (Year: 2018).*

(Continued)

*Primary Examiner* — Cuong H Nguyen
(74) *Attorney, Agent, or Firm* — Botos Churchill IP Law

(57) ABSTRACT

Aspects of the disclosure provide for controlling a vehicle in an autonomous driving mode. For instance, sensor data for an object as well as a plurality of predicted trajectories may be received. Each predicted trajectory may represent a plurality of possible future locations for the object. A grid including a plurality of cells, each being associated with a geographic area, may be generated. Probabilities that the object will enter the geographic area associated with each of the plurality of cells over a period of time into the future may be determined based on the sensor data in order to generate a heat map. One or more of the plurality of predicted trajectories may be compared to the heat map. The vehicle may be controlled in the autonomous driving mode based on the comparison.

23 Claims, 13 Drawing Sheets

(58) Field of Classification Search
CPC .... B60W 2554/402; B60W 2554/4029; G05D 1/0214; G05D 1/0088; G05D 1/0221
See application file for complete search history.

(56) References Cited

U.S. PATENT DOCUMENTS

| | | | |
|---|---|---|---|
| 9,248,834 B1 | 2/2016 | Ferguson et al. | |
| 10,969,789 B2* | 4/2021 | Refaat | G05D 1/0088 |
| 11,169,531 B2* | 11/2021 | Hong | G05D 1/0246 |
| 11,409,295 B1* | 8/2022 | Samdaria | G01C 21/383 |
| 11,535,248 B2* | 12/2022 | Phan | G01S 7/4814 |
| 11,783,614 B2* | 10/2023 | Russell | G08G 1/166 701/23 |
| 11,858,508 B2* | 1/2024 | Phan | B60W 30/0956 |
| 11,912,271 B2* | 2/2024 | Phan | G08G 1/096725 |
| 11,945,469 B2* | 4/2024 | Fonseca | G05D 1/0214 |
| 12,060,085 B2* | 8/2024 | Di Cairano | B60W 50/0097 |
| 12,065,140 B1* | 8/2024 | Pronovost | B60W 40/04 |
| 2012/0053755 A1 | 3/2012 | Takagi | |
| 2013/0054106 A1 | 2/2013 | Schmudderich et al. | |
| 2015/0284010 A1 | 10/2015 | Beardsley et al. | |
| 2017/0109644 A1 | 4/2017 | Nariyambut et al. | |
| 2017/0278400 A1 | 9/2017 | Ferguson | |
| 2017/0316333 A1 | 11/2017 | Levinson et al. | |
| 2018/0075309 A1 | 3/2018 | Sathyanarayana et al. | |
| 2018/0189323 A1 | 7/2018 | Wheeler | |
| 2018/0217603 A1 | 8/2018 | Kwon et al. | |
| 2018/0232967 A1* | 8/2018 | Segawa | H04N 7/188 |
| 2018/0348346 A1 | 12/2018 | Vallespi-Gonzalez et al. | |
| 2018/0349746 A1 | 12/2018 | Vallespi-Gonzalez | |
| 2019/0113919 A1* | 4/2019 | England | G05D 1/024 |
| 2019/0285752 A1 | 9/2019 | Chattopadhyay et al. | |
| 2019/0286145 A1* | 9/2019 | LaFary | G05D 1/0255 |
| 2019/0310651 A1 | 10/2019 | Vallespi-Gonzalez et al. | |
| 2019/0337511 A1 | 11/2019 | Nguyen et al. | |
| 2020/0097010 A1* | 3/2020 | Maila | B60W 60/0011 |
| 2020/0110416 A1* | 4/2020 | Hong | G01C 21/3602 |
| 2020/0150665 A1* | 5/2020 | Refaat | G05D 1/0221 |
| 2020/0324764 A1* | 10/2020 | Johnson | G08G 1/167 |

FOREIGN PATENT DOCUMENTS

| | | | | |
|---|---|---|---|---|
| CN | 118313518 A | * | 7/2024 | |
| CN | 118313566 A | * | 7/2024 | |
| DE | 102019110759 A1 | | 11/2019 | |
| EP | 2562060 A1 | | 2/2013 | |
| EP | 2961644 A1 | | 1/2016 | |
| EP | 3048023 A1 | | 7/2016 | |
| JP | 2010033352 A | | 2/2010 | |
| JP | 2021509232 A | * | 3/2021 | ........ H04W 28/0226 |
| KR | 20180061696 A | | 6/2018 | |
| WO | 2014131666 A1 | | 9/2014 | |
| WO | WO-2020097029 A1 | * | 5/2020 | ........ B60W 30/0953 |

OTHER PUBLICATIONS

B. Kim, C. M. Kang, J. Kim, S. H. Lee, C. C. Chung and J. W. Choi, "Probabilistic vehicle trajectory prediction over occupancy grid map via recurrent neural network," 2017 IEEE 20th Inter Conf on Intelligent Transportation Systems (ITSC), Yokohama, Japan, pp. 399-404, doi: 10.1109/ITSC.2017.831 (Year:2017).*

S. Glaser, B. Vanholme, S. Mammar, D. Gruyer and L. Nouveliere, "Maneuver-Based Trajectory Planning for Highly Autonomous Vehicles on Real Road With Traffic and Driver Interaction" in IEEE Trans on Intelligent Transportation Syst, vol. 11, No. 3, pp. 589-606, Sep. 2010, (Year:2010).*

K. Saleh, M. Hossny and S. Nahavandi, "Intent prediction of vulnerable road users from motion trajectories using stacked LSTM network," 2017 IEEE 20th International Conference on Intelligent Transportation Systems (ITSC), Yokohama, Japan, 2017, pp. 327-332, doi: 10.1109/ITSC.2017.8317941 (Year:2017).*

Philip Pecher et al "Data-Driven Vehicle Trajectory Prediction" SIGSIM-PADS '16 ACM (Year: 2016).*

Byeoung Do Kim et all, "Probabilistic Vehicle Trajectory Prediction . . . " IEEE (Year: 2017).*

International Search Report and Written Opinion for Application No. PCT/US2019/059795 dated Apr. 9, 2020.

The Extended European Search Report for European Patent Application No. 19883127.3, Jun. 8, 2022.

The First Office Action for Chinese Patent Application No. 201980080993.9, Dec. 28, 2021.

Notice of Allowance for European Patent Application No. 19883127.3, Jul. 15, 2024, 41 Pages.

* cited by examiner

VERIFYING PREDICTED TRAJECTORIES USING A GRID-BASED APPROACH

CROSS REFERENCE TO RELATED APPLICATIONS

The present application is a continuation of U.S. patent application Ser. No. 16/185,787, filed Nov. 9, 2018, the disclosure of which is hereby incorporated herein by reference.

BACKGROUND

Autonomous vehicles, such as vehicles that do not require a human driver, can be used to aid in the transport of passengers or items from one location to another. Such vehicles may operate in a fully autonomous mode where passengers may provide some initial input, such as a pickup or destination location, and the vehicle maneuvers itself to that location.

In order to determine how to maneuver a driverless vehicle through an environment with other independent actors such as vehicles, bicycles and pedestrians, it is critical for the driverless vehicle's computing devices to detect such actors and also make predictions about the future motion of those actors. Typical prediction systems may use behavior prediction models that evaluate the likelihood that an object will follow a given trajectory. Some trajectory models may even take into account the relative positions and movements of other actors when making such predictions.

BRIEF SUMMARY

One aspect of the disclosure provides a method of controlling a vehicle in an autonomous driving mode. The method includes receiving, by one or more processors, sensor data for an object; receiving, by the one or more processors, a plurality of predicted trajectories, each predicted trajectory representing a plurality of possible future locations for the object; generating, by the one or more processors, a grid including a plurality of cells each representing a geographic area; predicting, by the one or more processors, probabilities that the object will enter the geographic area of each of the plurality of cells over a period of time into the future based on the sensor data in order to generate a heat map; comparing, by the one or more processors, one or more of the plurality of predicted trajectories to the heat map; and controlling, by the one or more processors, the vehicle in the autonomous driving mode based on the comparison.

In one example, each predicted trajectory of the plurality of predicted trajectories is associated with a probability value, and the method further comprises, prior to the comparing, identifying the one or more of the plurality of predicted trajectories based on the probability values associated with the plurality of predicted trajectories and a threshold value. In this example, the threshold value is a threshold minimum probability value. In another example, the method also includes generating the plurality of predicted trajectories based on the sensor data. In another example, the object is a vehicle. In another example, the method also includes determining whether to generate the grid based on a type of the object. In another example, the method also includes determining whether to generate the grid based on an observed speed of the object. In another example, the comparing includes assessing validity of the one or more of the plurality of predicted trajectories. In this example, when the one or more of the plurality of predicted trajectories is assessed to be valid, controlling the vehicle is further based on the one or more of the plurality of predicted trajectories. Alternatively, when the one or more of the plurality of predicted trajectories is assessed not to be valid, controlling the vehicle is not based on the one or more of the plurality of predicted trajectories. In another example, the method also includes, based on the comparison, generating a new predicted trajectory based on the heat map, and the controlling is further based on the new predicted trajectory. In this example, generating the new predicted trajectory includes examining border cells of the heat map and averaging cell locations of the border cells based on the probabilities associated with the border cells. In addition, generating the new predicted trajectory further includes using the average and the location of the object to generate a constant curvature trajectory. In addition or alternatively, generating the new predicted trajectory includes taking an average of cell locations weighted by probabilities of all cells of the heat map. In this example, generating the new predicted trajectory further includes using the average and the location of the object to generate a constant curvature trajectory. In another example, the method also includes identifying a first set of cells of the heat map that meet a threshold minimum probability value Threshold, and wherein the comparison is further based on the identified first set of cells. In this example, the comparing further includes, for each given one of the one or more of the plurality of predicted trajectories, analyzing points of the given one to identify a second set of cells of the heat map closest to each of the points and comparing the first set of identified cells to the second set of identified cells. Alternatively, the comparing further includes, for each given one of the one or more of the plurality of predicted trajectories, searching points of the given one to identify a border cell through which the given one passes and comparing the border cell to the first set of cells. In another example, the comparing further includes determining whether the one or more of the plurality of trajectories overlaps with one or more cells of the heat map having probabilities that meet a minimum threshold probability value. In this example, the method also includes, when none of the one or more of the plurality of trajectories overlaps, flagging the plurality of trajectories as an anomaly.

DETAILED DESCRIPTION

Overview

Figure 1:
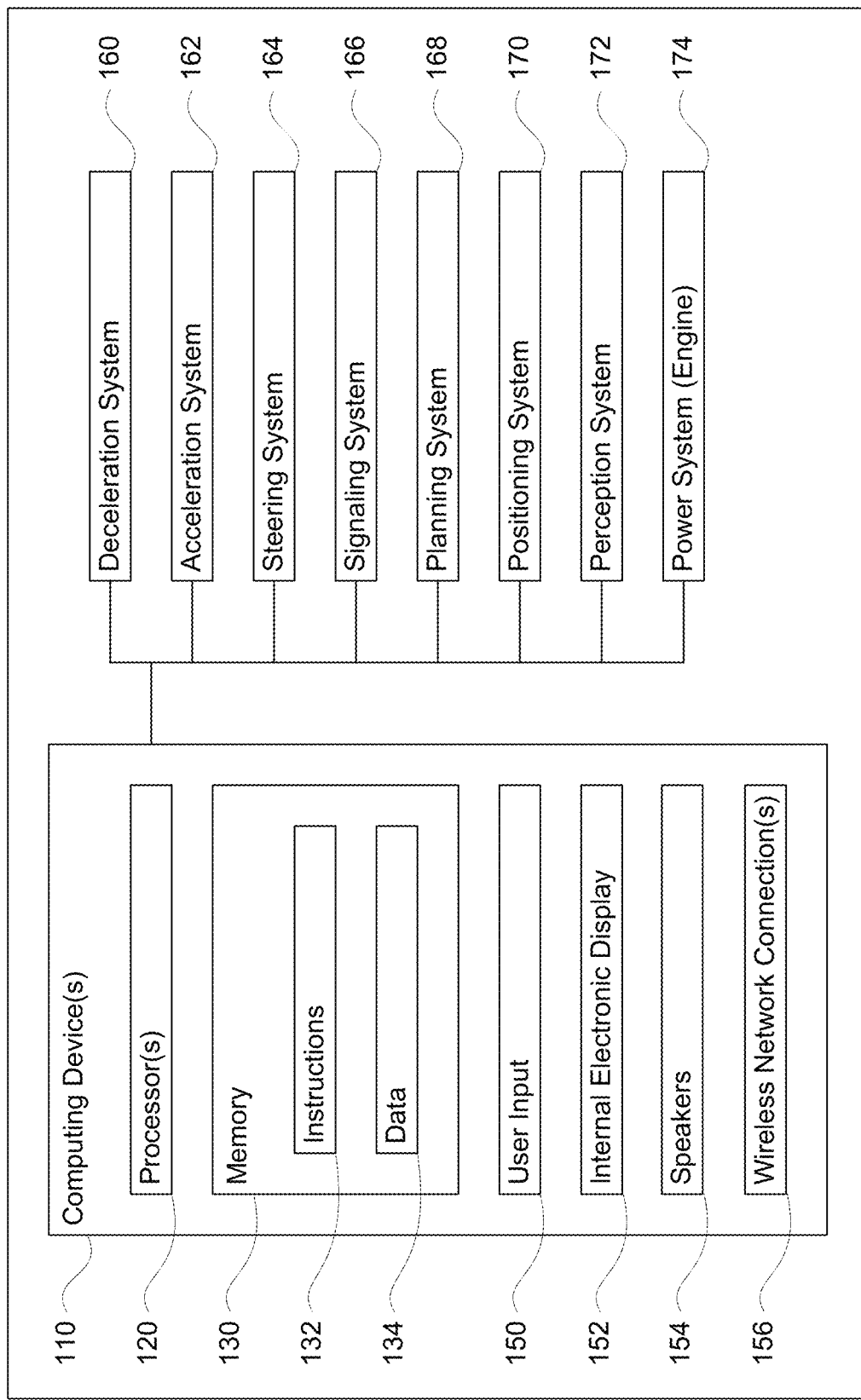
FIG. 1 is a functional diagram of an example vehicle in accordance with aspects of the disclosure.

The technology relates to assessing the validity of predicted trajectories of other road users using a grid-based approach. In order to determine how to maneuver a driverless vehicle through an environment with other independent actors such as vehicles, bicycles and pedestrians, it is critical for the driverless vehicle's computing devices to detect such actors and also make predictions about the future motion of those actors. Typical prediction systems may use learned trajectory proposal based behavior models to evaluate the likelihood that an object, such as another road user, will follow a given trajectory, for instance, based on previously observed motion. Some trajectory models may even take into account the relative positions and movements of other actors when making such predictions.

For instance, for each road user, one or more behavior models may be used to generate a plurality of trajectories. These models may be fairly simplistic, or may be highly sophisticated machine-learning models. In the case of a machine-learned model, each of these trajectories may be associated with a probability of how likely it is that the road user will follow that trajectory. In many instances, this trajectory modeling can be a practical and useful approach. However, in some instances, the agent's behavior may be difficult to predict. This is especially true in the case of other road users who are not following "the rules of the road", are behaving unpredictably or in ways previously unobserved or modeled, recklessly, and/or are simply moving very slowly.

While, these "bad" trajectories or imperfect predictions may be identified after the fact or "offline," doing so is ineffective for addressing these problems in real time. In order to address these obstacles, a grid-based prediction of possible future locations of a road user over a brief period of time into the future may be used.

For instance, for every road user detected by the vehicle's perception system, a grid may be projected around the road user. The size of the grid may correspond to an outward boundary for how far a road user would be able to move within the brief period of time. Using the observations about a road user, a value may be determined for each cell indicating how likely the road user could move into that cell over the brief period of time.

Accordingly, each grid cell may represent a probability that the road user will move into that cell over the brief period of time. This may provide a heat map of predicted locations of the road user. The heat map may then be used to assess the validity of the predicted trajectories. For instance, one or more predicted trajectories may then be compared to cells of the heat map to determine whether one or more of those trajectories overlap with high-probability cells. If not, the identified trajectories may not be fully capturing what the road user will do in the future. To address this, the vehicle's computing devices may generate an extra trajectory using the heat map in order to capture what the road user might be doing which could have been missed by the identified trajectories.

The features described herein allow for the verification of predicted trajectories in real time. Because the grid-based approach has a very small time horizon, it is more likely to accurately predict the behavior of a road user for a very small period of time. In other words, the heat map can leverage more of the agent's dynamics (e.g., curvature, velocity, acceleration, etc.) to achieve high accuracy. As such, it can be used to verify longer-term trajectory-based predictions. In addition, because the heat map covers all locations around a road user, the heat map may have the ability to capture and predict any motion by the road user, even those that were not modeled, not encountered or even illegal. At the same time, the identified trajectories may not cover all possible locations the road user may go to and therefore may not always be reliable. As such, the heat map can then be used to validate or check the identified trajectories and possibly complement them with an extra trajectory as described above.

Example Systems

As shown in FIG. 1, a vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, busses, recreational vehicles, etc. The vehicle may have one or more computing devices, such as computing device 110 containing one or more processors 120, memory 130 and other components typically present in general purpose computing devices.

The memory 130 stores information accessible by the one or more processors 120, including instructions 132 and data 134 that may be executed or otherwise used by the processor 120. The memory 130 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. The one or more processor 120 may be any conventional processors, such as commercially available CPUs. Alternatively, the one or more processors may be a dedicated device such as an ASIC or other hardware-based processor. Although FIG. 1 functionally illustrates the processor, memory, and other elements of computing device 110 as being within the same block, it will be understood by those of ordinary skill in the art that the processor, computing device, or memory may actually include multiple processors, computing devices, or memories that may or may not be stored within the same physical housing. As an example, internal electronic display 152 may be controlled by a dedicated computing device having its own processor or central processing unit (CPU), memory, etc. which may interface with the computing device 110 via a high-bandwidth or other network connection. In some examples, this computing device may be a user interface computing device which can communicate with a user's client device. Similarly, the memory may be a hard drive or other storage media located in a housing different from that of computing device 110. Accordingly, references to a processor or computing device will be understood to include references to a collection of processors or computing devices or memories that may or may not operate in parallel.

Computing device 110 may all of the components normally used in connection with a computing device such as the processor and memory described above as well as a user input 150 (e.g., a mouse, keyboard, touch screen and/or microphone) and various electronic displays (e.g., a monitor having a screen or any other electrical device that is operable to display information). In this example, the vehicle includes an internal electronic display 152 as well as one or more speakers 154 to provide information or audio visual experiences. In this regard, internal electronic display 152 may be located within a cabin of vehicle 100 and may be used by computing device 110 to provide information to passengers within the vehicle 100. The vehicle may also include one or more wireless network connections 156 to facilitate communicates with devices remote from the vehicle and/or between various systems of the vehicle.

In one example, computing device 110 may be an autonomous driving computing system incorporated into vehicle 100. The autonomous driving computing system may capable of communicating with various components and systems of the vehicle, for instance, wirelessly (via wireless network connections 156) and/or a wired connection (such as a controller area network bus or other communication bus). For example, returning to FIG. 1, computing device 110 may be in communication with various systems of vehicle 100, such as deceleration system 160 (for controlling braking of the vehicle), acceleration system 162 (for controlling acceleration of the vehicle), steering system 164 (for controlling the orientation of the wheels and direction of the vehicle), signaling system 166 (for controlling turn signals), navigation system 168 (for navigating the vehicle to a location or around objects), positioning system 170 (for determining the position of the vehicle), perception system 172 (for detecting objects in the vehicle's environment), and power system 174 (for example, a battery and/or gas or diesel powered engine) in order to control the movement, speed, etc. of vehicle 100 in accordance with the instructions 132 of memory 130 in an autonomous driving mode which does not require or need continuous or periodic input from a passenger of the vehicle. Again, although these systems are shown as external to computing device 110, in actuality, these systems may also be incorporated into computing device 110, again as an autonomous driving computing system for controlling vehicle 100.

The computing device 110 may control the direction and speed of the vehicle by controlling various components. By way of example, computing device 110 may navigate the vehicle to a destination location completely autonomously using data from the map information and navigation system 168. Computing devices 110 may use the positioning system 170 to determine the vehicle's location and perception system 172 to detect and respond to objects when needed to reach the location safely. In order to do so, computing devices 110 may cause the vehicle to accelerate (e.g., by increasing fuel or other energy provided to the engine by acceleration system 162), decelerate (e.g., by decreasing the fuel supplied to the engine, changing gears, and/or by applying brakes by deceleration system 160), change direction (e.g., by turning the front or rear wheels of vehicle 100 by steering system 164), and signal such changes (e.g., by lighting turn signals of signaling system 166). Thus, the acceleration system 162 and deceleration system 160 may be a part of a drivetrain that includes various components between an engine of the vehicle and the wheels of the vehicle. Again, by controlling these systems, computing devices 110 may also control the drivetrain of the vehicle in order to maneuver the vehicle autonomously.

As an example, computing device 110 may interact with deceleration system 160 and acceleration system 162 in order to control the speed of the vehicle. Similarly, steering system 164 may be used by computing device 110 in order to control the direction of vehicle 100. For example, if vehicle 100 configured for use on a road, such as a car or truck, the steering system may include components to control the angle of wheels to turn the vehicle. Signaling system 166 may be used by computing device 110 in order to signal the vehicle's intent to other drivers or vehicles, for example, by lighting turn signals or brake lights when needed.

Navigation system 168 may be used by computing device 110 in order to determine and follow a route to a location. In this regard, the navigation system 168 and/or data 134 may store map information, e.g., highly detailed maps that computing devices 110 can use to navigate or control the vehicle. As an example, these maps may identify the shape and elevation of roadways, lane markers, intersections, crosswalks, speed limits, traffic signal lights, buildings, signs, real time or historical traffic information, vegetation, or other such objects and information. The lane markers may include features such as solid or broken double or single lane lines, solid or broken lane lines, reflectors, etc. A given lane may be associated with left and right lane lines or other lane markers that define the boundary of the lane. Thus, most lanes may be bounded by a left edge of one lane line and a right edge of another lane line. As noted above, the map information may store known traffic or congestion information and/or and transit schedules (train, bus, etc.) from a particular pickup location at similar times in the past. This information may even be updated in real time by information received by the computing devices 110.

Figure 2:
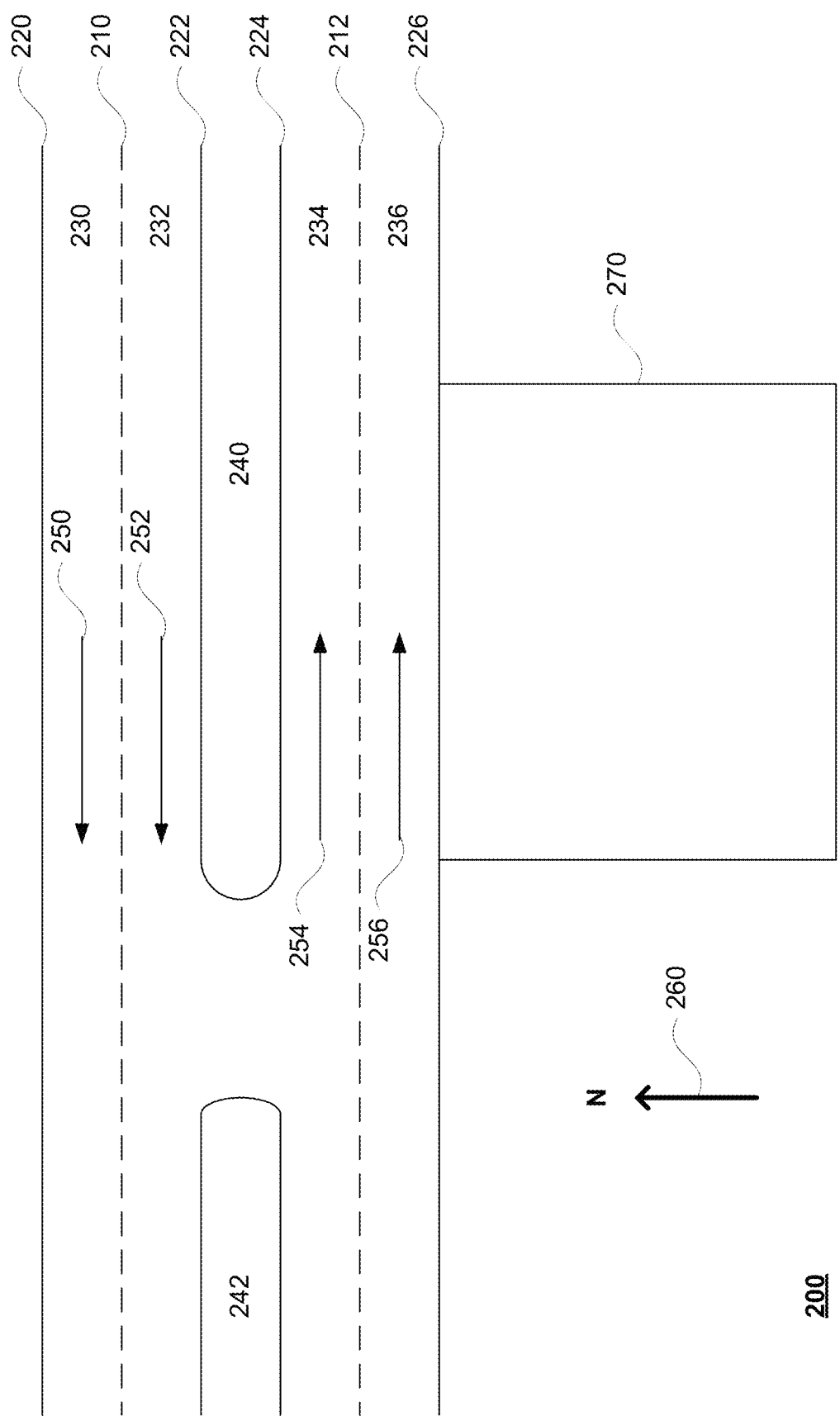
FIG. 2 is an example representation of map information in accordance with aspects of the disclosure.

FIG. 2 is an example of map information 200 for a section of roadway. In this example, map information 200 depicts a portion of the map information that includes information identifying the shape, location, and other characteristics of lane markers or lane lines 210, 212, curbs 220, 222, 224, 226, lanes 230, 232, 234, 236, and median areas 240, 242. In this example, the map information also indicates the direction of traffic for each lane as indicated by arrows 250, 252, 254, 256 and the orientation of the map information as indicated by arrow 260. In this regard, each of lanes 230 and 232 are west-bound lanes and each of lanes 234 and 236 are east-bound lanes. In this example, map information 200 also identifies a parking lot area 270, for instance, for a business. In addition to these features, the map information may also include information that identifies speed limits for each lane as well as information that allows the computing devices 110 to determine whether the vehicle has the right of way to complete a particular maneuver (i.e. complete a turn or cross a lane of traffic or intersection), as well as other features such as buildings, waterways, vegetation, signs, etc.

Although the detailed map information is depicted herein as an image-based map, the map information need not be entirely image based (for example, raster). For example, the detailed map information may include one or more roadgraphs or graph networks of information such as roads, lanes, intersections, and the connections between these features. Each feature may be stored as graph data and may be associated with information such as a geographic location and whether or not it is linked to other related features, for example, a stop sign may be linked to a road and an intersection, etc. In some examples, the associated data may include grid-based indices of a roadgraph to allow for efficient lookup of certain roadgraph features.

The perception system 172 also includes one or more components for detecting objects external to the vehicle such as other vehicles (such as other cars, trucks, busses, motorcycles, etc.), pedestrians, bicyclists, obstacles in the roadway, traffic signals, signs, trees, etc. For example, the perception system 172 may include one or more LIDAR sensors, sonar devices, radar units, cameras and/or any other detection devices that record data which may be processed by computing devices 110. The sensors of the perception system may detect objects and their characteristics such as location, orientation, size, shape, type (for instance, vehicle, pedestrian, bicyclist, etc.), heading, rate of change of heading, speed, acceleration, rate of change of acceleration, deceleration, rate of change of deceleration, etc. The raw data from the sensors and/or the aforementioned characteristics can be quantified or arranged into a descriptive function, vector, and or bounding box and sent for further processing to the computing devices 110 periodically and continuously as it is generated by the perception system 172.

As discussed in further detail below, computing devices 110 may use the positioning system 170 to determine the vehicle's location and perception system 172 to detect and respond to objects when needed to reach the location safely.

Figure 3:
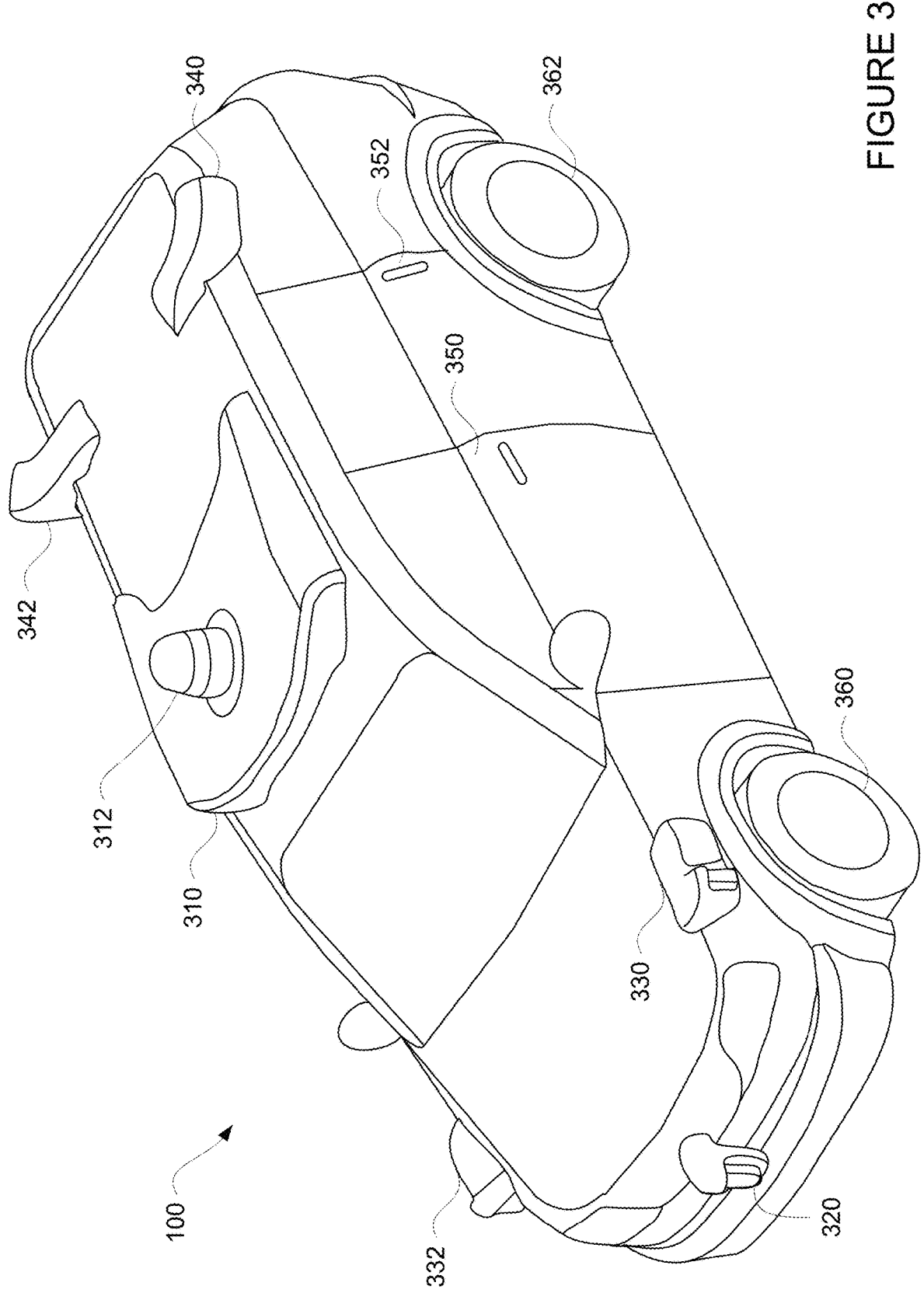
FIG. 3 is an example external view of a vehicle in accordance with aspects of the disclosure.

For instance, FIG. 3 is an example external view of vehicle 100. In this example, roof-top housing 310 and dome housing 312 may include a LIDAR sensor as well as various cameras and radar units. In addition, housing 320 located at the front end of vehicle 100 and housings 330, 332 on the driver's and passenger's sides of the vehicle may each store a LIDAR sensor. For example, housing 330 is located in front of driver door 350. Vehicle 100 also includes housings 340, 342 for radar units and/or cameras also located on the roof of vehicle 100. Additional radar units and cameras (not shown) may be located at the front and rear ends of vehicle 100 and/or on other positions along the roof or roof-top housing 310. Vehicle 100 also includes many features of a typical passenger vehicle such as doors 350, 352, wheels 360, 362, etc.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

As the vehicle 100 is maneuvered by the computing devices 110, the vehicle's perception system 172 may receive sensor data from the various sensors. This sensor data may be used to detect objects in the vehicle's environment. Once an object is detected, computing devices 110 and/or perception system 172 may determine the object's type, for example, a traffic cone, pedestrian, a vehicle (such as a passenger car, truck, bus, etc.), bicycle, etc. Objects may be identified by various models which may consider various characteristics of the detected objects, such as the size of an object, the speed of the object (bicycles do not tend to go faster than 40 miles per hour or slower than 0.1 miles per hour), the heat coming from the bicycle (bicycles tend to have rider that emit heat from their bodies), etc. In addition, the object may be classified based on specific attributes of the object, such as information contained on a license plate, bumper sticker, or logos that appear on the vehicle.

Figure 4:
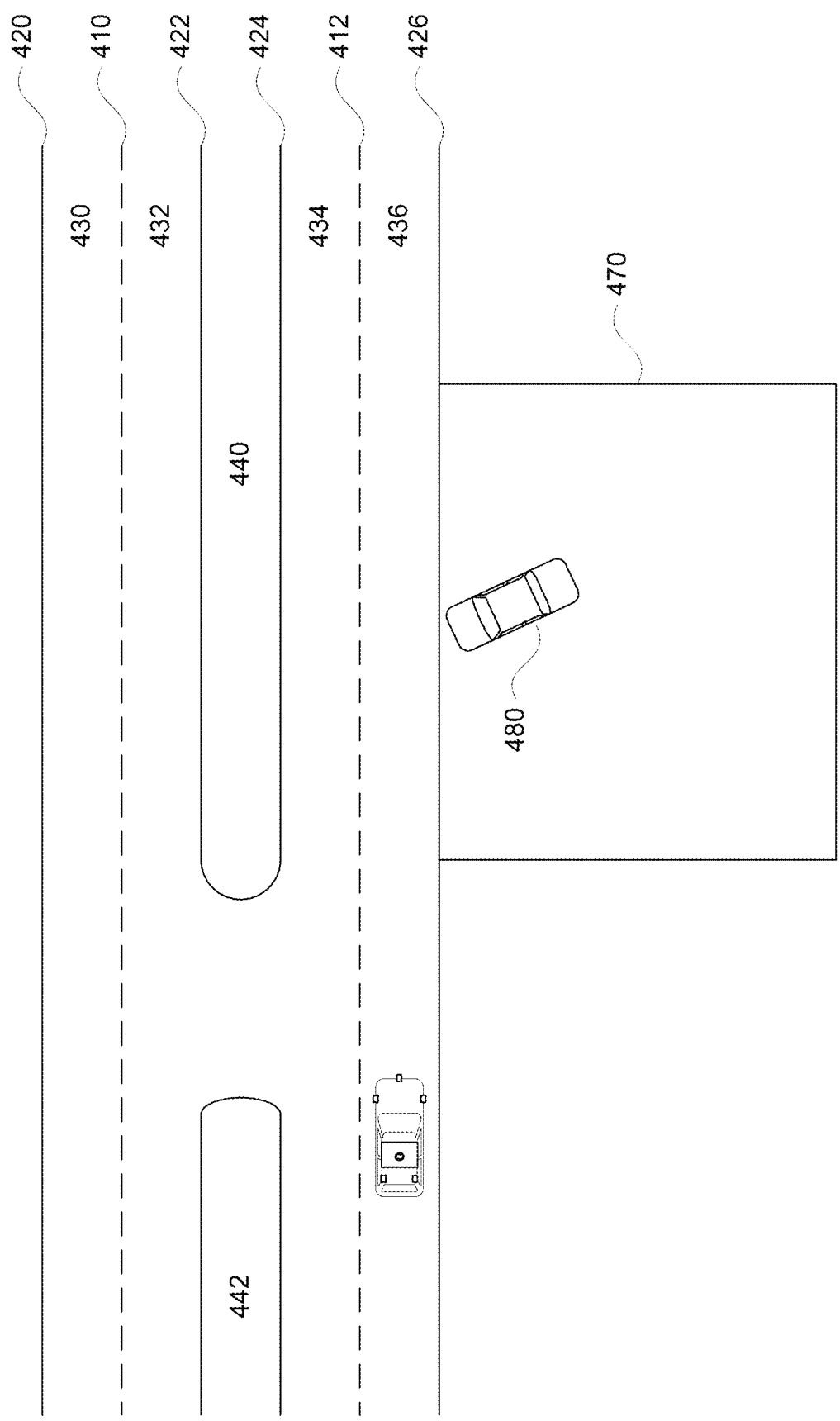
FIG. 4 is an example top-down view of a vehicle and its environment in accordance with aspects of the disclosure.

FIG. 4 is a top down view of vehicle 100 driving in an environment corresponding to the area of the map information 200. In this example, lane lines 410, 412, curbs 420, 422, 424, 426, lanes 430, 432, 434, 436, median areas 440, 442, and parking lot 470 correspond to the shape, location, and other characteristics of lane markers or lane lines 210, 212, curbs 220, 222, 224, 226, lanes 230, 232, 234, 236, median areas 240, 242, and parking lot 270, respectively. In this example, the direction of traffic for each lane 430, 432, 434, 436 correspond to the directions of traffic indicated by arrows 250, 252, 254, 256. In this regard, each of lanes 430 and 432 are west-bound lanes and each of lanes 434 and 436 are east-bound lanes. In the example of FIG. 4, vehicle is driving east-bound in lane 436. In addition, the perception system 172 and/or computing devices 110 may detect and identify vehicle 480 as another road user, here a vehicle, in parking lot 470. The perception system 172 and/or computing devices 110 may also determine the aforementioned characteristics of the vehicle 480 based on the sensor information.

For each detected object, one or more behavior models may be used to generate a plurality of trajectories. Each trajectory may include a plurality of possible locations and corresponding times at which an object is expected to be located over a period of time into the future. For instance, this period of time may be 10 seconds or more or less. In one example, computing devices 110 and/or perception system 172 may be operable to predict another road user's trajectory based solely on the other road user's instant direction, acceleration/deceleration and velocity, e.g., that the other object's current direction and movement will continue. However, memory 130 may also store behavior models that provide the probability of one or more actions being taken by a detected object. These models may be fairly simplistic, or may be highly sophisticated machine-learning models. In the case of a machine-learned model, each of these trajectories may be associated with a probability of how likely it is that the road user will follow that trajectory. In some examples, these probabilities may sum to 1 for a given road user. The number of trajectories generated may depend on the number of reasonable or feasible options available to that road user, such as the number of lanes, number of turning options, etc.

In some instances, to increase the usefulness of these behavior models, each behavior model may be associated with a specific type of road users. For instance, one type of behavior model may be used for objects identified as pedestrians, another type of behavior model may be used for objects identified as vehicles, another type of behavior may be used for objects identified as bicycles or bicyclists, etc. The behavior models may be used by the computing devices 110 in order to predict one or more trajectories for the road user by analyzing data relating to the object's characteristics (such as the detected or estimated size, shape, location, orientation, heading, velocity, acceleration or deceleration, change in acceleration or deceleration, etc.) as well as the road user's current surroundings (such as the road user's location relative to the map information, relative locations and behaviors of other road users, etc.), and to determine how that other road user will likely respond. In this regard, the behavior models may function from an object-centric view of the road user's environment, in that the system determines what the other road users are perceiving in order to better predict how those road user's will behave. In this regard, in at least some instances, the behavior models may also indicate whether the predicted behavior for a road user is responsive to a particular other road user including the vehicle 100.

Figure 5:
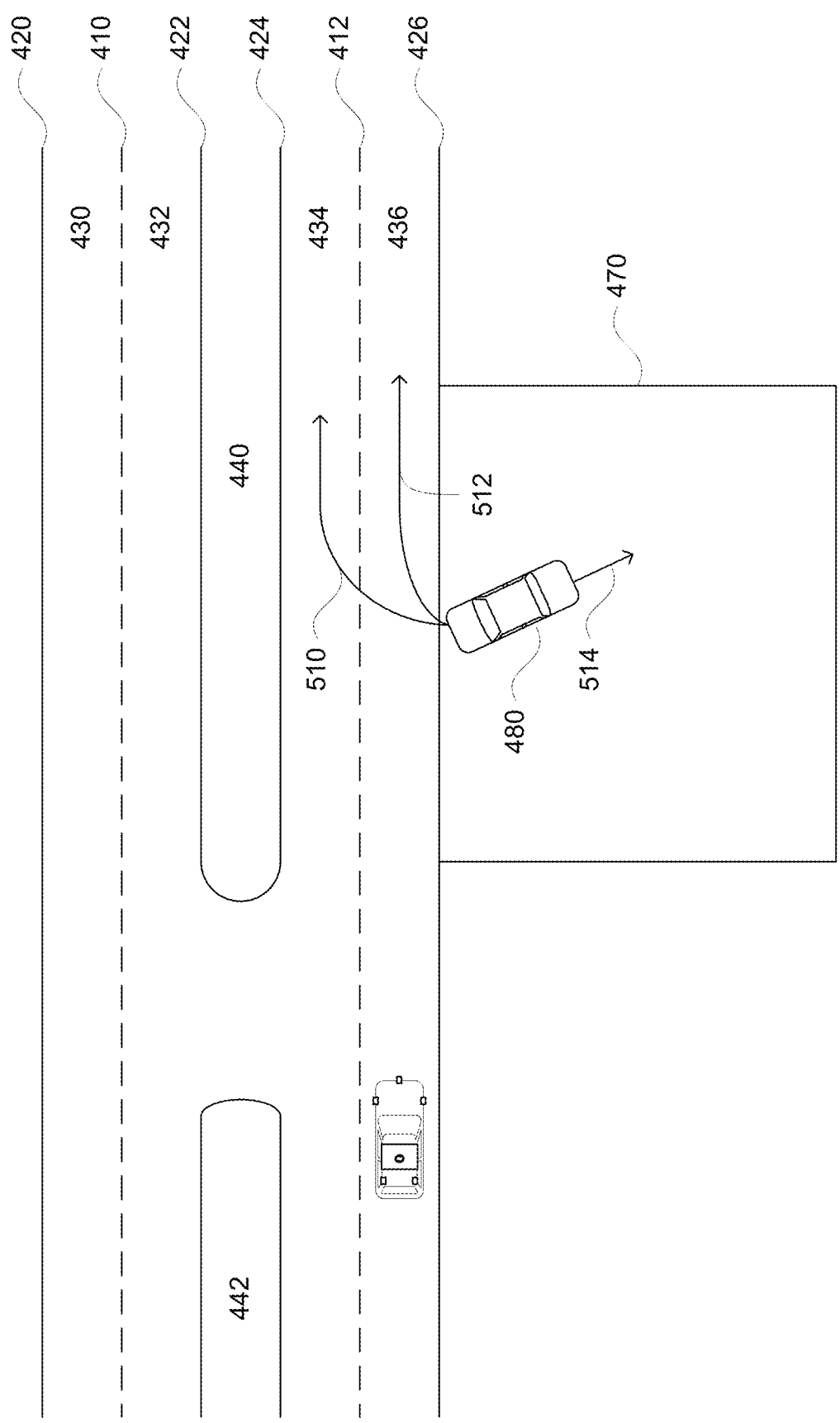
FIG. 5 is an example of a plurality of trajectories for a road user in accordance with aspects of the disclosure.

FIG. 5 provides an example set of predicted trajectories for vehicle 480 based on its observed characteristics. In this example, the set of predicted trajectories includes trajectory 510, 512, 514. Each of these trajectories includes a plurality of possible locations and corresponding times at which an object is expected to be located over a period of time into the future. In addition, as in the machine-learning example, each of these trajectories may be associated with a probability that the vehicle 480 will follow that trajectory, and together these probabilities may sum to 1. For instance, trajectory 510 may be associated with a probability of 0.3 (i.e. 30%) that vehicle 480 will make a right hand turn into lane 434, trajectory 512 may be associated with a probability of 0.65 (i.e. 65%) that vehicle 480 will make a right hand turn into lane 436, and trajectory 514 may be associated with a probability of 0.05 (i.e. 5%) that vehicle 480 will reverse further into parking lot 470.

For every object identified as a road user that is detected by the perception system 172, the computing devices 110 may project a grid around that object. The grid may include a plurality of cells, reach representing a geographic area around the road user. The grid may be arranged such that any point or a given point on the road user is at the center of the grid. The size of the grid may correspond to an outward boundary for how far a road user would be able to move within a brief period of time. This brief period of time may be significantly shorter than the period of time for the predicted trajectories. For instance, if the brief period of time is 2 seconds or less, such as 1.5 seconds, the grid may be 27 meters by 27 meters with 0.5 meter cells. Of course, the size selection may be larger or smaller as needed to address tradeoffs between computational resources (time and effort) and prediction precision.

Figure 6A:
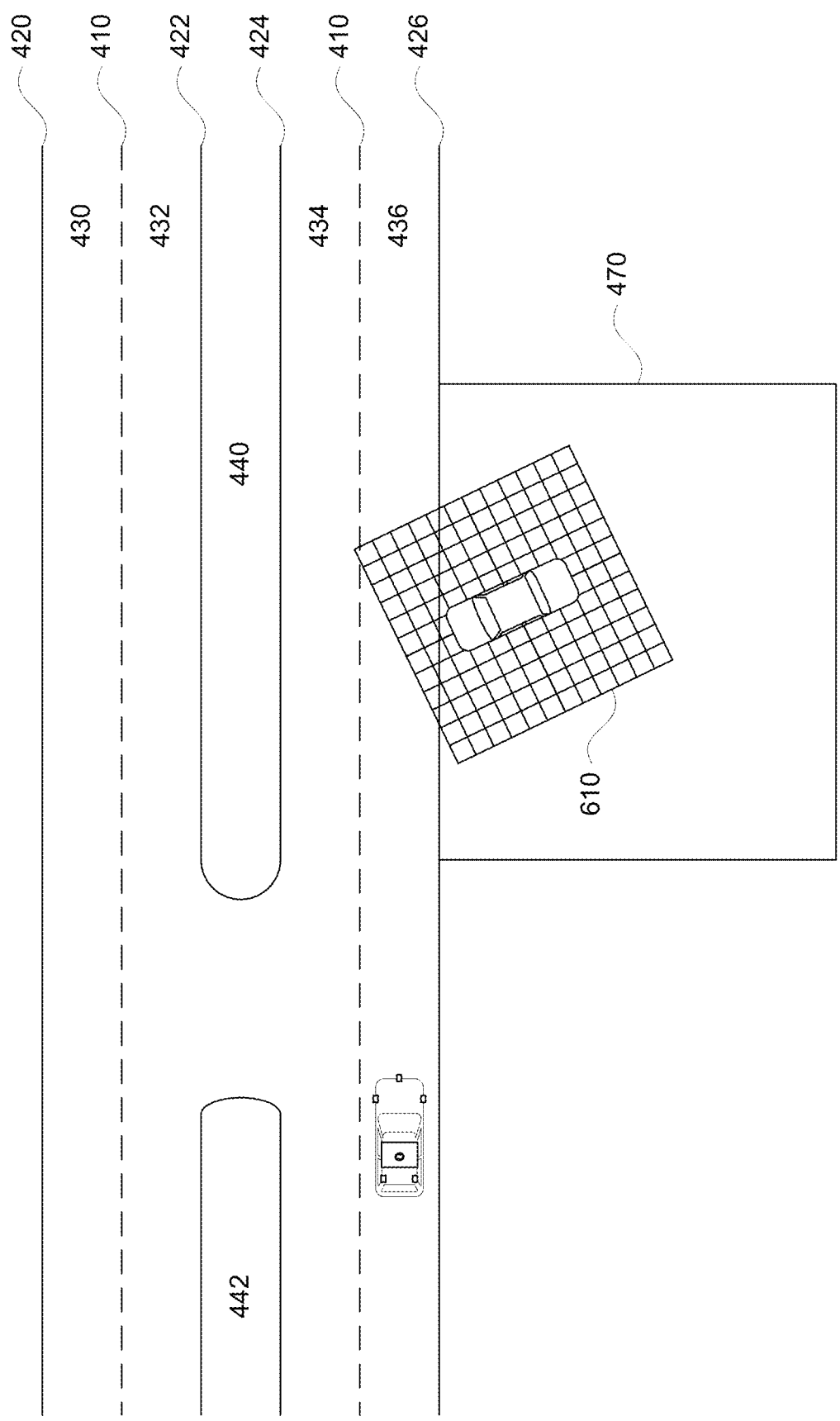
FIGS. 6A and 6B are an example projection of a grid in accordance with aspects of the disclosure.
Figure 6B:
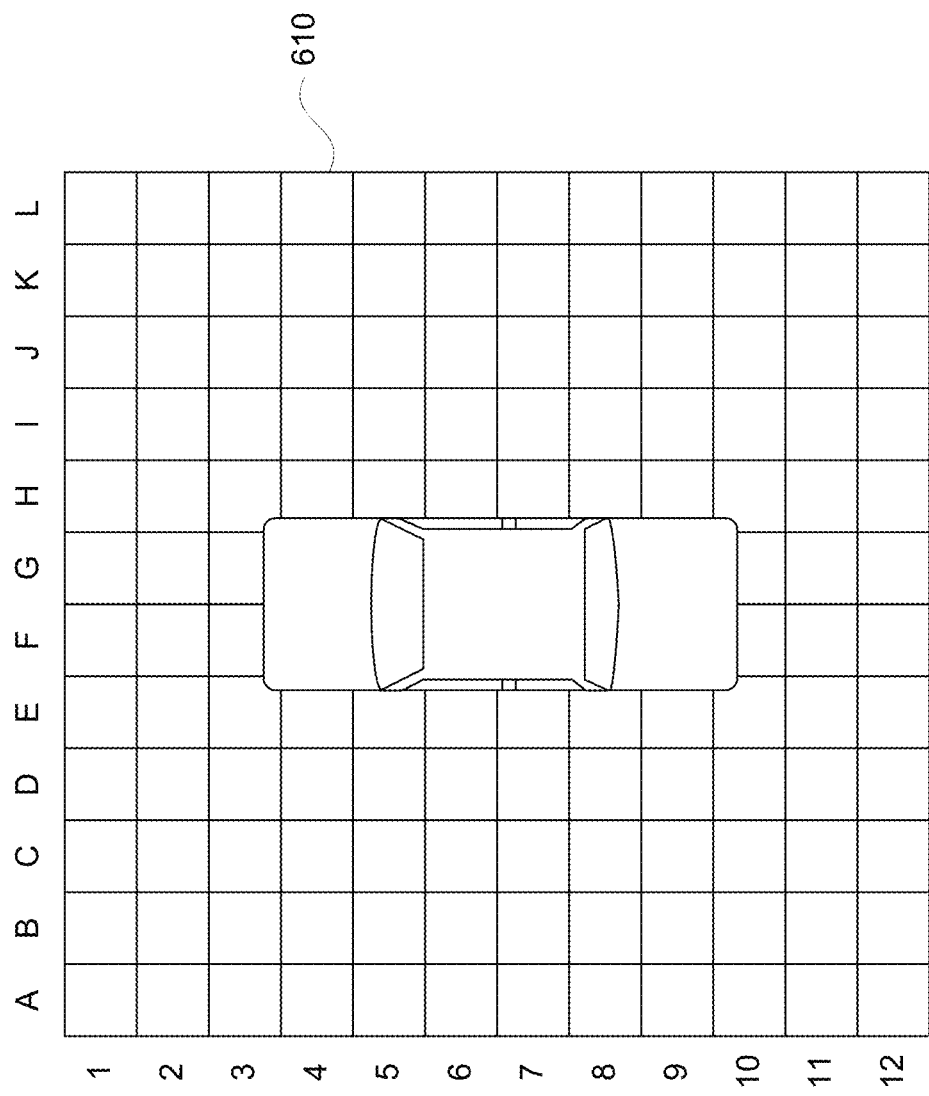

FIG. 6A is an example projection of a grid 610 for vehicle 480. FIG. 6B is an example detail view of the grid 610. As can be seen, in this example, grid 610 is a 12 by 12 grid of 144 cells. Of course, as noted above, larger or small grids and/or cells may also be used. FIG. 6B also provides column references A-L and row references 1-12. These references, such as A1, B2, etc. will be used to reference different cells of the grid.

Using the observed speed of a road user, heading or direction of movement, curvature or the rate of change of the heading, orientation, acceleration or deceleration, changes in acceleration or deceleration, etc., the computing devices 110 may determine a value for each cell. These values may indicate how likely the road user could move into the geographic area of that cell over the brief period of time. For instance, a vehicle may be more likely to move forward and enter grid cells to the front left or right than grid cells behind the vehicle (which would require the vehicle to reverse or change direction by 180 degrees). Accordingly, each grid cell may represent a probability that a vehicle will move into that cell (or rather, some portion of the road user will occupy that cell and/or any portion of that cell), at some point over the brief period of time.

Figure 7:
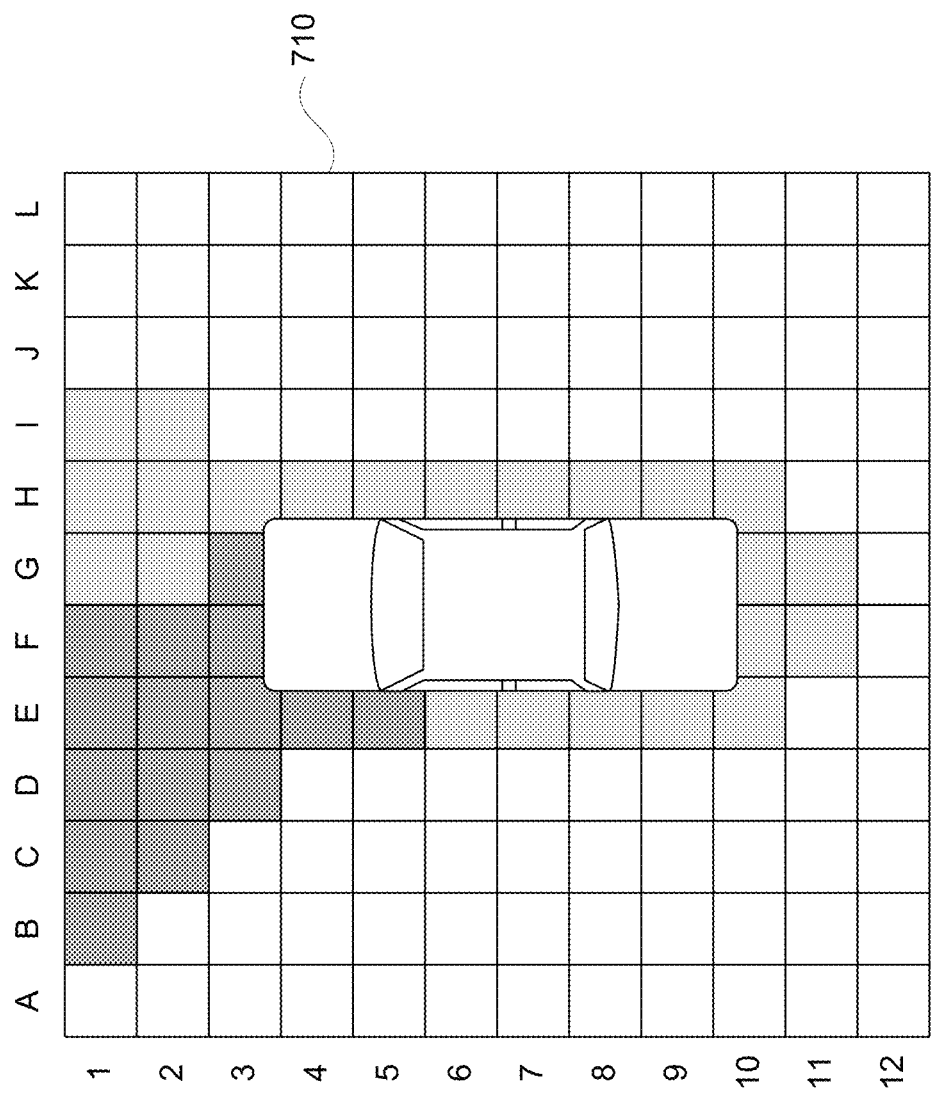
FIG. 7 is an example heat map in accordance with aspects of the disclosure.

A top-down view of the grid provides a heat map with some areas having higher likelihoods that a road user will traverse grid cells being darkest, and those where the road user is unlikely to traverse being lightest. Thus, intensity of each cell is dependent upon the prediction for that cell. In this regard, FIG. 7 represents a heat map 710 for grid 610. Again, the darker shaded cells, such as those of cells B1, C1, C2, etc. represent highest probabilities and white cells, such as those of cells A1, A2, etc. represent lowest probabilities, and cells having shading in between, such as those of cells H1, I2, etc. represent moderate probabilities or probabilities between those of the highest and the lowest probability cells. Of course, the scale may also be reversed such that the lightest cells of a heat map are those with the greatest probabilities while the darkest cells are those with the lowest probabilities, etc.

The heat map may then be used to assess the validity of the predicted trajectories for the road user. For instance, each predicted trajectory having a threshold minimum probability value T may be identified by the computing devices 110. As an example, T may be some value greater than 0.1 or more or less assuming the probabilities of the trajectories sum to 1 as noted above may. For instance, referring to FIG. 5, from the set of predicted trajectories including trajectories 510, 512, 514, trajectories 510 and 512 may be identified as trajectories having probabilities that exceed the threshold minimum probability value T.

The computing devices 110 may compare the identified trajectories to cells of the heat map to determine whether one or more of those trajectories overlap with high-probability cells. This may involve iterating through all cells in the grid to identify those having a threshold minimum probability value K. As an example, K may be some value greater than 0.1 or more or less and may be the same or a different value from T. K may be a learned or hand-tuned value. Those cells having a probability greater than K may be included in a list. For instance, the darkest shaded cells, such as cells B1, C1, D1, E1, F1, C2, D2, E2, F2, D3, E3, F3, G3, E4, and E5 may each have a probability greater than the threshold minimum probability value K. In this regard, each of the aforementioned cells may be included in the list.

Alternatively, rather than iterating through all cells of the grid, the computing devices 110 may analyze only the edge or border cells of the grid to identify those border cells with probabilities that meet the threshold minimum probability value K. For instance, the border cells may include all cells in rows 1 and 12 as well as all cells in columns A and L. In this example, the darkest shaded border cells, such as cells B1, C1, D1, E1, and F1 may each have a probability greater than the threshold minimum probability value K. In this regard, each of the aforementioned cells may be included in the list.

Figure 8A:
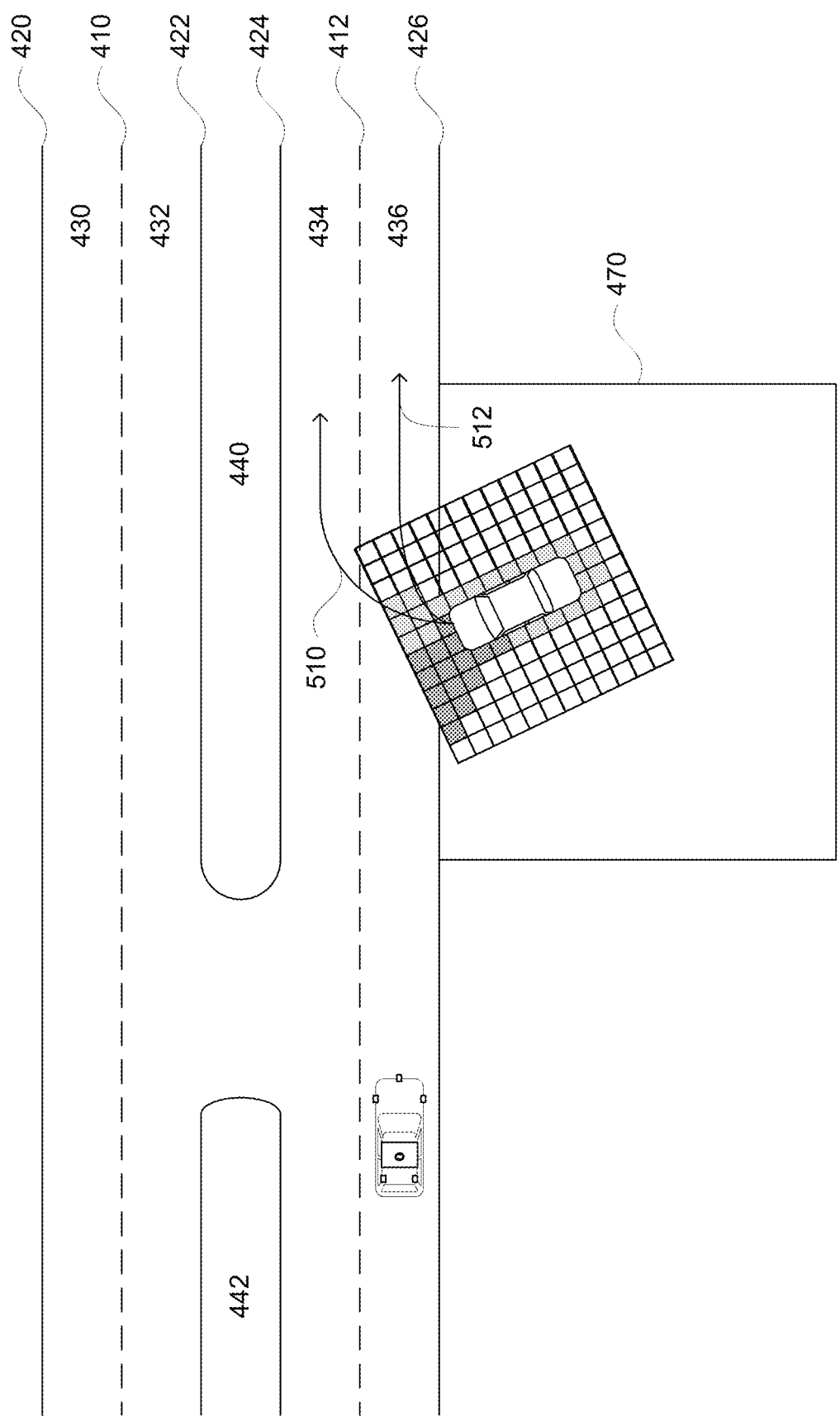
FIGS. 8A and 8B are example comparisons of data in accordance with aspects of the disclosure.
Figure 8B:
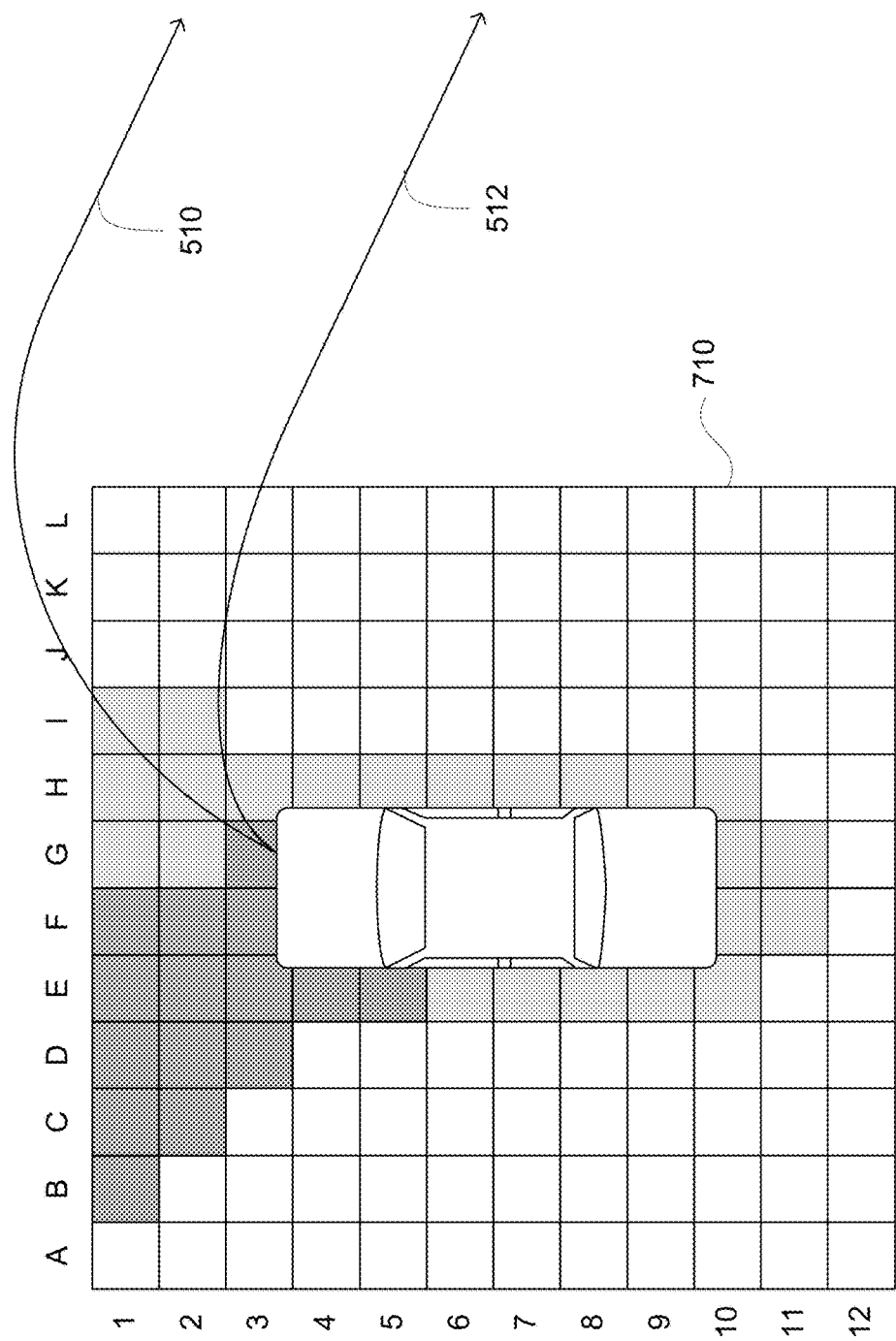

Each of the identified trajectories, may be overlaid onto the grid and/or analyzed point by point by the computing devices 110 in order to identify a cell of the grid closest to each point on the identified trajectory. These identified cells may then be compared to the list. If each identified cell is included in the list or more than a threshold minimum number of cells, then the identified trajectory overlaps with the high probability cells and can be validated. If less than a threshold number of cells overlaps with the highest probability cells, the identified trajectory is not validated. For the purposes of comparison, FIG. 8A provides an example view of the heat map 710 projected over the identified trajectories 510, 512. FIG. 8B provides a detail view of this projection. As can be seen from FIG. 8B, trajectory 510 passes through cells G3, H2, H1, and I1. Only cell G3 is included in the list of all cells having probabilities that meet the threshold minimum probability value K. Thus, trajectory 510 would not be validated. Trajectory 512 passes through cells G3, H3, H2, I2, J2, K3, and L3. Only cell G3 is included in the list of all cells having probabilities that meet the threshold minimum probability value K. Thus, trajectory 512 would not be validated.

Alternatively, rather than comparing all points of an identified trajectory, the points of an identified trajectory may be searched to identify one that overlaps with a border cell. If this border cell is included in the list, then the predicted trajectory overlaps with the high probability border cells, and the predicted trajectory can be validated. As can be seen from FIG. 8B, trajectory 510 passes through border cells H1 and I1 which are not included in the list of border cells having probabilities that meet the threshold minimum probability value K. Thus, trajectory 510 would not be validated. Trajectory 512 passes through border cell L3 which is not included in the list of border cells having probabilities that meet the threshold minimum probability value K. Thus, trajectory 512 would not be validated.

If there is at least one of the identified trajectories that is validated (e.g. includes more than a threshold number of points on this identified trajectory closest to cells that are included in the list and/or the border cell of this identified trajectory is included in the list), then all of identified trajectories may be validated by the computing devices 110. In this regard, the computing devices 110 may need to only iterate through the identified trajectories until a validated trajectory is found. In some instances, individual trajectories which are not validated may be flagged as anomalies in order to allow further analysis of such trajectories and/or the trajectory generation software of computing devices 110 by human operators.

However, if none of the identified trajectories are validated (i.e. there are no identified trajectories with more than a threshold number of points closest to cells that are included in the list and/or the border cell of the identified trajectory is not included in the list), the identified trajectories may be not validated and/or flagged as an anomaly by the computing devices 110. In this circumstance, the identified trajectories may not be fully capturing what the road user will do in the future.

To address this circumstance, the computing devices 110 may generate a new predicted trajectory using the heat map in order to capture what the road user might be doing which could have been missed by the identified trajectories. As one approach, a trajectory may be fit to the cells by examining the border cells of the heat map and averaging the cell locations of the border cells having the highest probability. From this average cell location, and the location of the road user at the center of the grid and the road user's current heading, a new trajectory may be determined. For instance, a new trajectory may be determined from the average cell location of the border cells, the location of the road user at the center of the grid, and the road user's current heading. As an example, with this information, the computing devices 110 may compute the constant curvature to reach the average cell location of the border cells from the location of road user and the current heading. This constant curvature may be used to determine the new trajectory.

As another approach, the average of cell locations weighted by the probabilities of all of the cells of the heat map or grid may be taken. From this average cell location of all cells, the location of the road user at the center of the grid, and the road user's current heading, a new trajectory may be determined. As an example, with this information, the computing devices 110 may compute a constant curvature to reach the average cell location of all cells from the location of road user and the current heading. This constant curvature may be used to determine the new trajectory.

Figure 9:
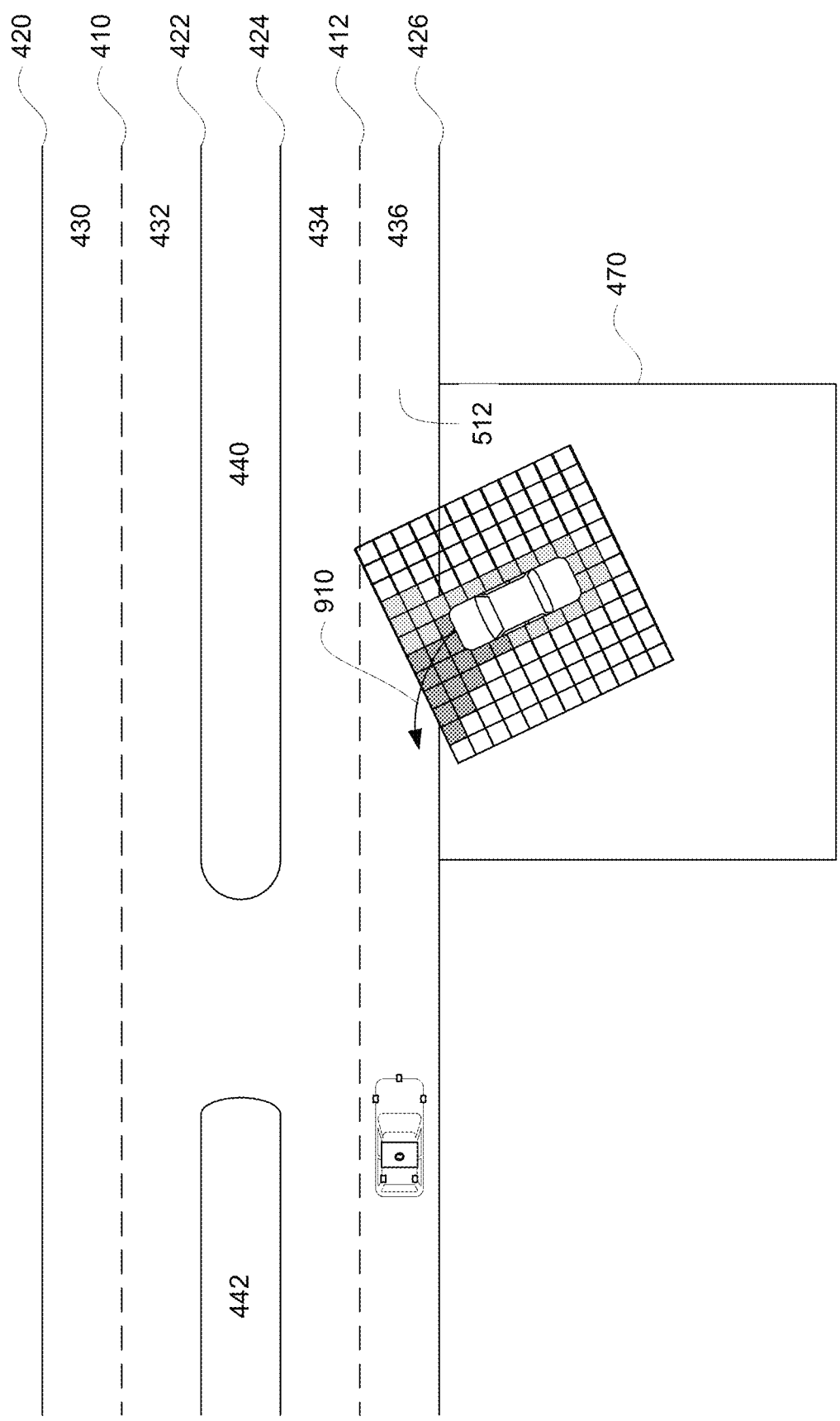
FIG. 9 is an example trajectory in accordance with aspects of the disclosure.

FIG. 9 provides an example of a new trajectory 910 generated based on the heat map 710. For instance, trajectory 910 may be a constant curvature trajectory determined as in either of the examples described above. In this example, rather than following "the rules of the road" and turning right into lanes 434 or 436 and traveling east-bound, the vehicle 480 is likely to make a left turn into lane 436 while traveling west-bound into oncoming traffic.

Figure 10:
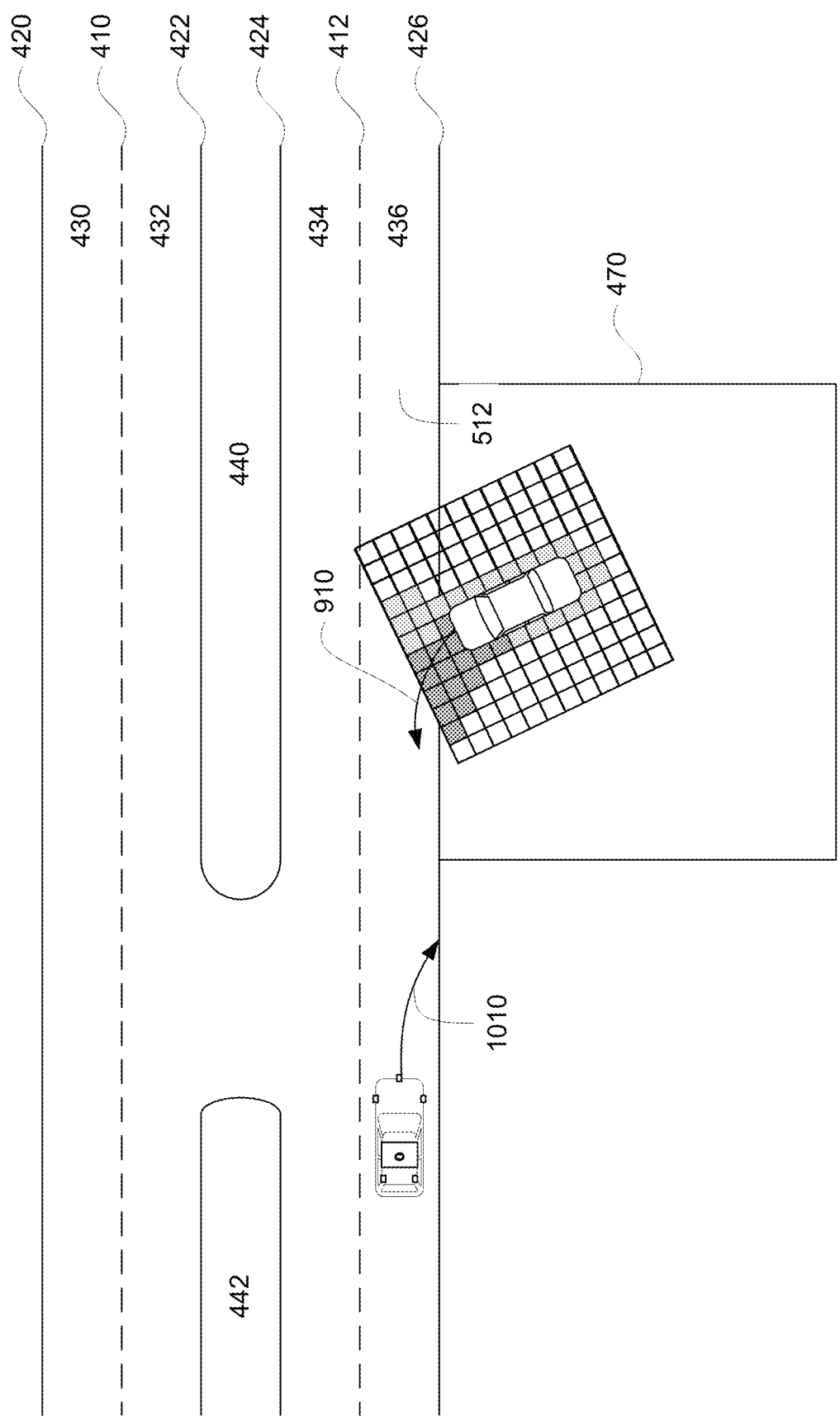
FIG. 10 is an example of a path of a vehicle in accordance with aspects of the disclosure.

The resulting new trajectory, and in some cases, the identified trajectories, may then be used to determine how to control the vehicle in the autonomous driving mode in order to avoid the object. For instance, the new trajectory and the identified trajectories may be used to generate physical constraints for the vehicle, or rather, locations and times which the vehicle should not pass through. In this regard, when planning a future path or trajectory for the vehicle, the computing devices 110 may attempt to avoid these physical constraints. Thus, even when a road user is behaving in a way that was not captured by the identified trajectories, this may still be captured by the constant curvature trajectory. FIG. 10 is an example of a path 1010 that the computing devices 110 may have determined in order to move into lane 434. In doing so, this may allow the vehicle 100 to avoid a collision with or coming too close to vehicle 480 based on the constant curvature trajectory 910 as well as the identified trajectories 510, 512. Thus, the computing devices 110 may control the vehicle in the autonomous driving mode in order to follow this path as described above, and the computing devices 110 are able to avoid collisions or simply coming too close to the road user.

This verification of predicted trajectories may be performed for all road users or only for certain types of road users with or without certain characteristics. For instance, only predicted trajectories of other vehicles may be verified and/or vehicles that are moving at a certain predetermined speed. For example, it may be especially useful to verify trajectories of other vehicles that are moving at or below 10 miles per hour as these vehicles may tend to be more unpredictable, and in addition, the grid-based approach is especially useful for short term predictions. In other words, for faster moving road users such as vehicles on a highway, the grid-based approach is less useful as the vehicle can quickly go beyond a region of the heat map.

Figure 11:
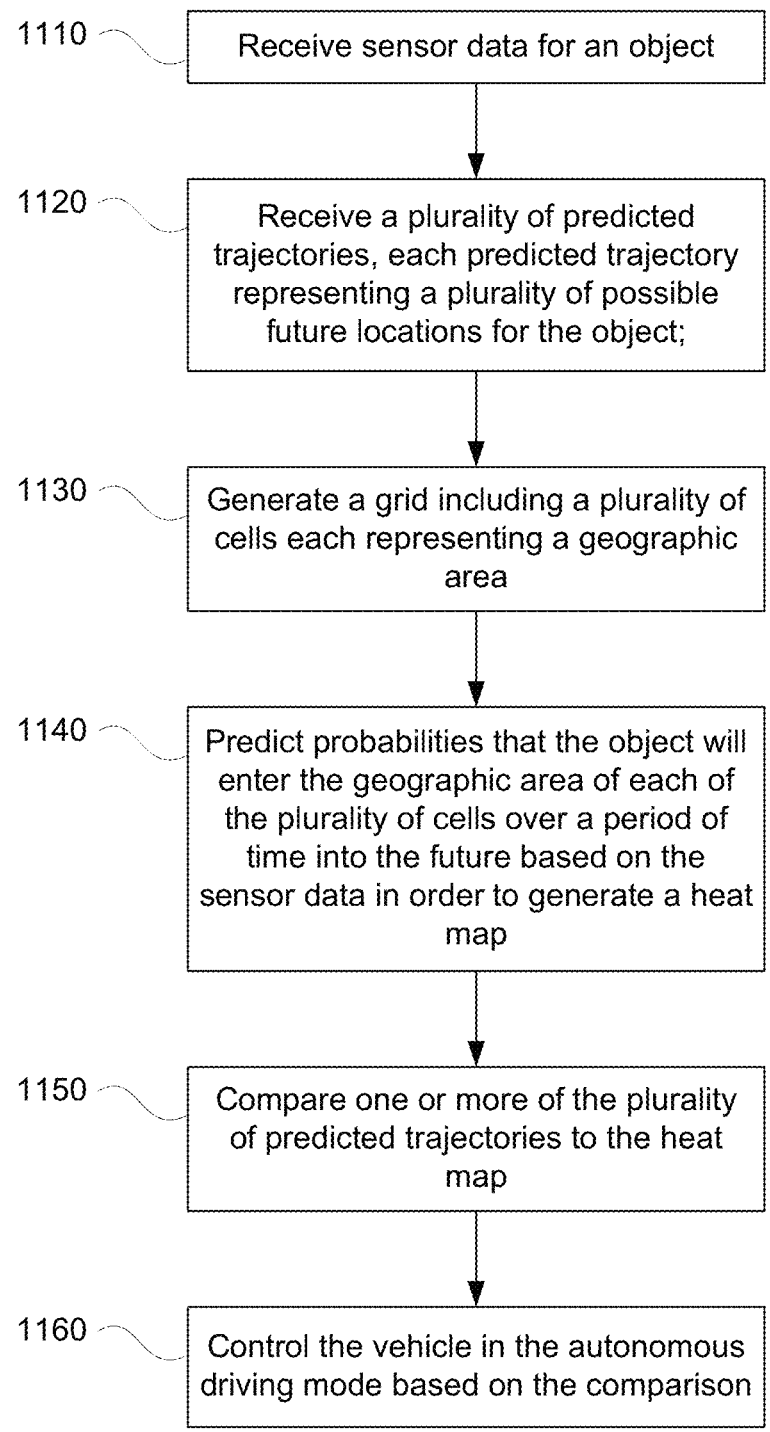
FIG. 11 is a flow diagram in accordance with aspects of the disclosure.

FIG. 11 is a flow diagram 1100 that may be performed by one or more processors such as one or more processors 120 of computing devices 110 in order to control a vehicle in an autonomous driving mode. In this example, at block 1110, sensor data is received for an object. At block 1120, a plurality of predicted trajectories are received. Each predicted trajectory represents a plurality of possible future locations for the object. At block 1130, a grid including a plurality of cells is generated. Each cell of the plurality of cells represents a geographic area. At block 1140, probabilities that the object will enter the geographic area of each of the plurality of cells over a period of time into the future are predicted based on the sensor data in order to generate a heat map. At block 1150, one or more of the plurality of predicted trajectories are compared to the heat map. At block 1160, the vehicle is controlled in the autonomous driving mode based on the comparison. As noted above, unless otherwise stated, the features of the flow diagram and described herein may be performed in various orders. For instance, block 1130 may occur at the same time as or before block 1120.

The features described herein allow for the verification of predicted trajectories in real time. Because the grid-based approach has a very small time horizon, it is more likely to accurately predict the behavior of a road user for a very small period of time. In other words, the heat map can leverage more of the road user's dynamics (e.g., curvature, velocity, acceleration, etc.) to achieve high accuracy. As such, it can be used to verify longer-term trajectory-based predictions. In addition, because the heat map covers all locations around a road user, the heat map may have the ability to capture and predict any motion by the road user, even those that were not modeled, not encountered or even illegal. At the same time, the identified trajectories may not cover all possible locations the road user may go to and therefore may not always be reliable. As such, the heat map can then be used to validate or check the identified trajectories and possibly complement them with an extra trajectory as described above.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method, comprising:
receiving, by one or more processors, sensor data for an object detected in an environment of a vehicle;
receiving, by the one or more processors, a plurality of predicted trajectories for the object, each predicted trajectory representing a plurality of possible future locations for the object;
generating, by the one or more processors, a grid of cells around the object, the grid of cells having a boundary associated with motion of the object, each cell of the grid of cells representing a respective portion of a geographic area around the object;
determining, by the one or more processors based on the sensor data, for each cell of the grid of cells, a respective probability that the object, over a period of time into the future, will enter the respective portion of the geographic area;
identifying, by the one or more processors, one or more cells of the grid of cells that overlap with one or more of the plurality of predicted trajectories; and
controlling, by the one or more processors, the vehicle in an autonomous driving mode based on the respective probabilities for the one or more identified cells.

2. The method of claim 1, further comprising, prior to identifying the one or more cells, identifying the one or more of the plurality of predicted trajectories based on respective trajectory probability values associated with the plurality of predicted trajectories and a threshold probability value.

3. The method of claim 2, wherein:
the threshold probability value is a threshold minimum probability value,
identifying the one or more of the plurality of predicted trajectories includes determining, by the one or more processors, whether each of the respective trajectory probability values is at least the threshold minimum probability value, and
the respective trajectory probability values of the one or more of the plurality of predicted are determined to be at least the threshold minimum probability value.

4. The method of claim 1, further comprising, generating, by the one or more processors, the plurality of predicted trajectories based on the sensor data.

5. The method of claim 1, wherein the object is another vehicle different from the vehicle.

6. The method of claim 1, further comprising:
determining, by the one or more processors based on the sensor data, whether the object is of a particular type of object; and
generating, by the one or more processors, the grid in response to determining that the object is of the particular type of object.

7. The method of claim 1, further comprising:
determining, by the one or more processors based on the sensor data, whether a speed of the object is at least a threshold speed; and
generating, by the one or more processors, the grid in response to determining that the speed of the object is at least the threshold speed.

8. The method of claim 1, further comprising
receiving, by the one or more processors, sensor data for another object detected in the environment of the vehicle;
receiving, by the one or more processors, a plurality of predicted trajectories for the other object, each predicted trajectory representing a plurality of possible future locations for the other object; and
generating, by the one or more processors, another grid of cells around the other object, a dimension of the other grid of cells being based on a speed of the other object, each cell of the other grid of cells representing a respective portion of a geographic area around the other object.

9. The method of claim 8, further comprising:
determining, by the one or more processors based on the sensor data for the other object, for each cell of the other grid of cells, a respective probability that the other object, over another period of time into the future, will enter the respective portion of the geographic area;
identifying, by the one or more processors, one or more cells of the other grid of cells that overlap with one or more of the plurality of predicted trajectories for the other object; and
controlling, by the one or more processors, the vehicle in the autonomous driving mode based on the respective probabilities for the one or more identified cells of the other grid of cells.

10. The method of claim 1, further comprising, assessing, by the one or more processors, validity of the one or more of the plurality of predicted trajectories based on the respective probabilities for the one or more identified cells.

11. The method of claim 1, further comprising, based on the respective probabilities for the one or more identified cells, generating, by the one or more processors, a new predicted trajectory based on one or more of the respective probabilities for the grid of cells, and wherein the controlling is further based on the new predicted trajectory.

12. The method of claim 11, wherein generating the new predicted trajectory includes examining, by the one or more processors, border cells of the grid of cells and taking an average of border cell locations weighted by the respective probabilities for the border cells.

13. The method of claim 12, wherein generating the new predicted trajectory further includes generating, by the one or more processors, a constant curvature trajectory using the average and a location of the object.

14. The method of claim 11, wherein generating the new predicted trajectory includes taking, by the one or more processors, an average of cell locations for two or more cells of the grid of cells weighted by the respective probabilities for the two or more cells.

15. The method of claim 14, wherein generating the new predicted trajectory further includes generating, by the one or more processors, a constant curvature trajectory using the average and a location of the object.

16. The method of claim 1, further comprising:
identifying, by the one or more processors, a first set of cells of the grid of cells based on the respective probabilities for the first set of cells being at least a threshold minimum probability value; and
determining, by the one or more processors, whether the one or more of the plurality of predicted trajectories overlap the first set of cells.

17. The method of claim 16, further comprising, for a given predicted trajectory of the one or more of the plurality of predicted trajectories:
identifying, by the one or more processors, a second set of cells of the grid of cells closest to points of the given predicted trajectory; and
determining, by the one or more processors, whether the first set of cells includes one or more of the second set of cells.

18. The method of claim 16, further comprising, for a given predicted trajectory of the one or more of the plurality of predicted trajectories:
identifying, by the one or more processors, a border cell of the grid of cells that overlaps the given predicted trajectory; and
determining, by the one or more processors, whether the first set of cells includes the border cell.

19. The method of claim 1, further comprising, determining, by the one or more processors, whether the respective probabilities for the one or more identified cells are at least a threshold minimum probability value.

20. The method of claim 19, further comprising, responsive to determining that none of the respective probabilities for the one or more identified cells is at least the threshold minimum probability value, flagging, by the one or more processors, the one or more of the plurality of predicted trajectories as anomalous.

21. The method of claim 10, wherein controlling the vehicle is further based on assessing the validity of the one or more of the plurality of predicted trajectories.

22. The method of claim 10, further comprising, assessing, by the one or more processors, the validity of a given predicted trajectory of the one or more of the plurality of predicted trajectories by:
identifying, by the one or more processors, one or more of the one or more identified cells of the grid of cells that the given predicted trajectory overlaps; and
determining, by the one or more processors, whether the respective probabilities for at least one of the one or more of the one or more identified cells are at least a threshold probability value.

23. The method of claim 22, further comprising, validating, by the one or more processors, the given predicted trajectory in response to determining that at least one of the one or more of the one or more identified cells are at least the threshold probability value.

* * * * *